(No Model.)
E. CARDARELLI.
WATER HEATING AND COOKING APPARATUS.
No. 506,810. Patented Oct. 17, 1893.
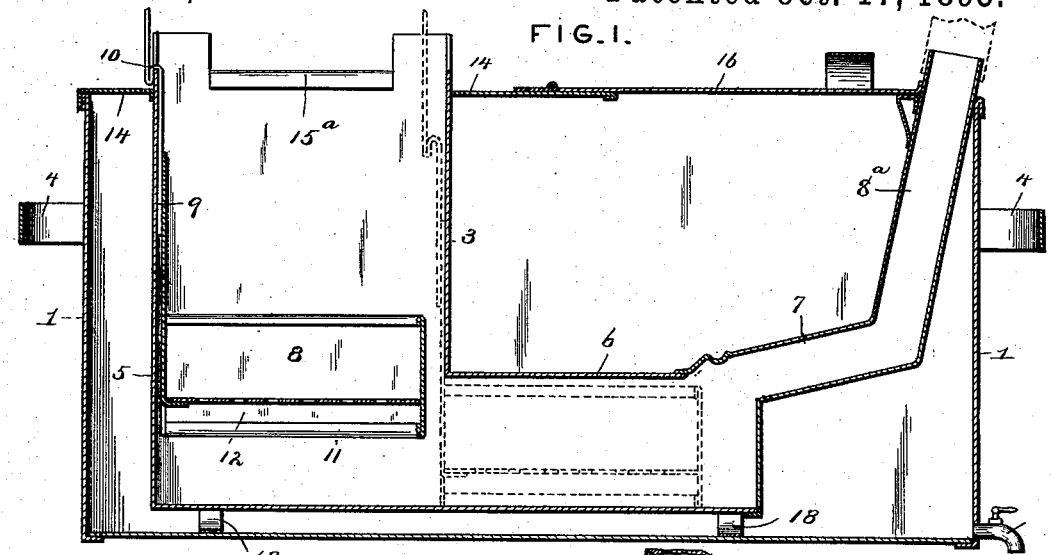
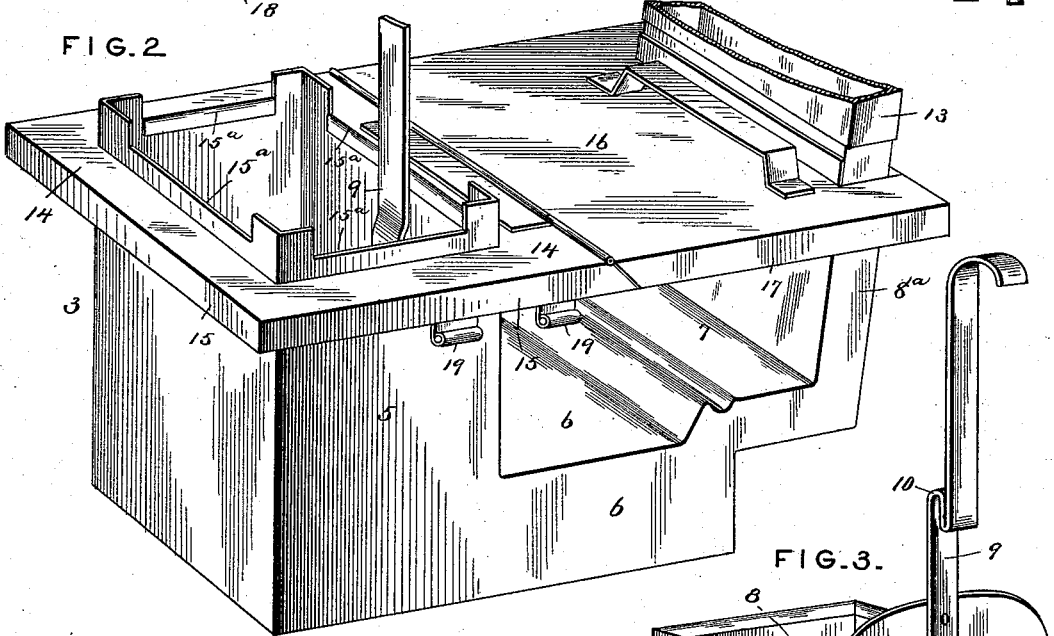
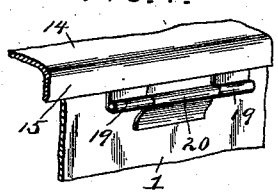
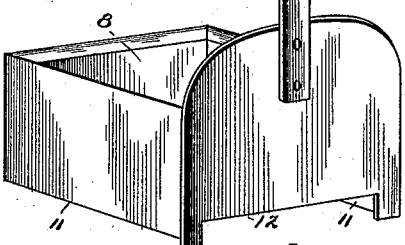
Witnesses
Harry L. Amer.
N. J. Riley
Inventor
Emilio Cardarelli.
By his Attorneys,
C. A. Snow & Co.

UNITED STATES PATENT OFFICE.

EMILIO CARDARELLI, OF SUMTER, SOUTH CAROLINA, ASSIGNOR OF ONE-HALF TO GEORGE W. DICK, OF SAME PLACE.

WATER-HEATING AND COOKING APPARATUS.

SPECIFICATION forming part of Letters Patent No. 506,810, dated October 17, 1893.

Application filed November 30, 1892. Renewed September 19, 1893. Serial No. 485,886. (No model.)

*To all whom it may concern:*

Be it known that I, EMILIO CARDARELLI, a citizen of the United States, residing at Sumter, in the county of Sumter and State of South Carolina, have invented a new and useful Water-Heating and Cooking Apparatus, of which the following is a specification.

The invention relates to improvements in water heating and cooking apparatuses.

The object of the present invention is to provide a simple and inexpensive combined water heating and cooking apparatus adapted when desired to be arranged for partial submersion in a body of water, such as a bath-tub, or the like, and capable of being arranged for combined cooking and water heating.

The invention consists in the construction and novel combination and arrangement of parts hereinafter fully described, illustrated in the accompanying drawings and pointed out in the claims hereto appended.

In the drawings—Figure 1 is a vertical longitudinal sectional view of a combined water heater and cooker constructed in accordance with this invention, and showing the parts arranged for cooking. Fig. 2 is a perspective view of the heater removed from the casing and arranged for partial submersion in a body of water. Fig. 3 is a detail perspective view of the fire-box. Fig. 4 is a detail view of the means for locking the heater in the outer casing.

Like numerals of reference indicate corresponding parts in all the figures of the drawings.

1 designates an outer casing or tank adapted to contain water and provided at one end with a faucet 2 and receiving within it a removable heater 3 adapted when removed from the casing or tank 1 to be placed within a body of water to be heated, such as a bath-tub. The casing or tank 1 is provided at each end with a suitable handle 4.

The removable heater consists of a vertical body 5 rectangular in section, and provided at its bottom with a horizontal extension 6 which communicates at one end with a slightly inclined flue 7 leading to a chimney $8^a$. The body 5 has arranged within it a fire-box 8 which has a perforated bottom, and is provided with a stem 9 having a hook 10 adapted to engage the upper edge of the body to support the box within the body above the bottom of the same, when the heater is arranged for cooking; and at this time the draft comes down the chimney through the flue and extension 6 to the body. The fire-box which may contain charcoal, a gasoline burner, or any suitable source of heat is adapted to be detached from the upper edge of the body, and to be lowered to the bottom of the body and to be moved into the chamber formed by the extension 6; and the fire-box is provided with depending flanges 11 extending around three of the sides and leaving an opening 12 at one side to create a draft. When used for cooking the chimney $8^a$ is short, but when the heater is removed from the outer casing or tank, a chimney section 13 is placed on the chimney $8^a$, and the draft is reversed, and enters at the top of the body. The chimney section 13 is removable and may be readily placed in position on the chimney 8, and removed therefrom accordingly as the heating apparatus is employed for cooking or for heating water solely.

The body is provided near its upper edge with an outwardly extending flange 14 having depending edges 15, and the top of the body is provided at each side with a recess $15^a$ to provide draft openings when a pan, oven or the like, is placed upon the body. The flange 14 extends around all of the sides of the body and has hinged to its inner end a cover 16 having depending edges 17, and provided with a handle. The cover 16, and the horizontal flange 14 co-operate to form a cover or top for the outer casing or tank; and the hinged cover 16 which is provided at one end with a recess to receive the chimney may be raised for filling the tank or outer casing.

The heater 3 is supported by transversely disposed feet 18 arranged at the ends of the heater and consisting of bars having their ends bent upward, and secured to the bottom of the heater. The feet prevent the bottom of the heater coming in contact with the bottom of a tank or reservoir or bath-tub, and at the same time permit a circulation of water beneath the heater, thereby greatly increasing the heating power of the apparatus.

The flange 14 is provided at each side of the heater with a pair of eyes 19 adapted to receive between them an eye 20 of the outer casing or tank 1, and to be secured to the same by a pin passing through the eye.

When the removable heater is placed in a bath-tub or other water receptacle it should be anchored, and this may be done by placing any suitable weight upon the top or other portion of the heater.

It will be seen that the apparatus may be arranged for combined cooking and water heating, and that it is capable of being placed in a bath-tub or similar receptacle for heating water solely.

I desire it to be understood that changes in the form, proportion and the minor details of construction may be resorted to without departing from the principle or sacrificing any of the advantages of this invention.

Besides cooking and heating water, a variety of other uses and advantages of the apparatus will readily present themselves, such as using the hinged cover which is arranged over the tank for keeping articles warm without cooking them.

What I claim is—

1. A heating apparatus comprising an outer casing, and a removable heater consisting of a body provided with a horizontal extension, a chimney communicating with the outer end of the extension, and a fire-box adapted to be supported within the body above the bottom thereof and to be arranged in the horizontal extension, substantially as described.

2. A heating apparatus comprising an outer casing and a removable heater provided with a cover or top for the outer casing and having at its bottom a horizontal extension and provided with a chimney, and a fire-box adapted to be supported within the body above the bottom thereof and be arranged in the horizontal extension, substantially as described.

3. A heating apparatus comprising an outer casing, and a removable heater arranged within the outer casing and comprising a body having a horizontal extension at its bottom, a chimney communicating with the extension, a horizontal flange extending around the top of the body, a hinged cover arranged at the inner side of the horizontal flange and forming with the same a top for the outer casing, and a fire-box arranged within the body and adapted to be supported above the bottom thereof and to be arranged within the extension, substantially as described.

4. A heating apparatus comprising an outer casing, and a removable heater consisting of a body having a horizontal extension at its bottom, a chimney communicating with the extension and provided with a removable section, and a fire-box arranged within the body and having a stem provided with a hook adapted to engage the upper edge of the body to support the fire-box above the bottom of said body, said fire-box being adapted to be arranged within the horizontal extension, substantially as described.

5. A heating apparatus comprising an outer casing, and a removable heater arranged within the casing and consisting of a body having a horizontal extension at its bottom and provided at its top with recesses, a chimney communicating with the extension, and the fire-box arranged within the body and provided with supporting flanges at its bottom and having a stem provided with a hook adapted to engage the upper edge of the body, said fire-box being of a size to fit within the extension of the removable heater, whereby the direction of the draft may be changed substantially as described.

6. A heating apparatus comprising an outer casing, and a removable heater consisting of a body having a horizontal extension at its bottom and provided at its top with a horizontal flange, a cover hinged to the horizontal flange and forming with the same a top for the outer casing, a chimney communicating with the horizontal extension of the body and provided with a removable section, and a fire-box arranged within the body and adapted to fit in the horizontal extension and provided with supporting flanges and having a stem with a hook, substantially as described.

In testimony that I claim the foregoing as my own I have hereto affixed my signature in the presence of two witnesses.

EMILIO CARDARELLI.

Witnesses:
JOHN H. SIGGERS,
HORACE G. PIERSON.